US007422399B1

(12) United States Patent
Salsberry et al.

(10) Patent No.: US 7,422,399 B1
(45) Date of Patent: Sep. 9, 2008

(54) DEBEADING TOOL FOR BUTT-WELDED PLASTIC PIPE

(76) Inventors: Rolland Edward Salsberry, 1834 NE Ione Loop, Camas, WA (US) 98607; Randle Flick Salsberry, 1834 Ione Loop, Camas, WA (US) 98607

( * ) Notice: Subject to any disclaimer, the term of this patent is extended or adjusted under 35 U.S.C. 154(b) by 183 days.

(21) Appl. No.: 11/531,622

(22) Filed: Sep. 13, 2006

(51) Int. Cl.
*B23D 1/08* (2006.01)
*B23B 5/16* (2006.01)
*B23Q 5/04* (2006.01)

(52) U.S. Cl. .................. 409/299; 409/140; 409/143

(58) Field of Classification Search ........... 409/139, 409/140, 143, 185, 298, 299, 300; 82/1.2, 82/1.4, 113; 29/27 C; 408/129
See application file for complete search history.

(56) References Cited

U.S. PATENT DOCUMENTS

| 4,250,775 A * | 2/1981 | Jerue et al. ................. 82/1.2 |
| 4,742,738 A * | 5/1988 | Strand ........................ 82/1.4 |
| 4,758,121 A * | 7/1988 | Kwech ...................... 409/185 |
| 4,939,965 A * | 7/1990 | Bircumshaw ................ 82/113 |
| 6,402,438 B1 * | 6/2002 | Boyer ........................ 408/144 |
| 6,447,220 B1 * | 9/2002 | Ricci et al. ................. 82/113 |
| 6,553,874 B2 * | 4/2003 | Burr .......................... 82/113 |
| 6,792,820 B2 * | 9/2004 | Wentworth et al. ......... 73/865.8 |
| 6,821,063 B2 * | 11/2004 | Debat et al. ................ 409/143 |
| 7,223,054 B1 * | 5/2007 | Cady ........................ 409/143 |
| 2003/0154585 A1 * | 8/2003 | Lotz ............................ 29/33 A |

OTHER PUBLICATIONS

Operations Manual, Bead Trimmer II, R&L Manufacturing, Inc., Camas, Washington, 2004.
"Fusible C900/C905 PVC Introduced," Trenchless Technology, Dec. 2003.
Griffin, Jeff, senior editor, Underground Construction, "Fusible PVC, Prechlorinated Bursting Offer Unique Solution for Florida Water Project," Rehabilitation Technology, Jul. 2006.

* cited by examiner

*Primary Examiner*—Dana Ross
(74) *Attorney, Agent, or Firm*—Marger Johnson & McCollom, P.C.

(57) ABSTRACT

A debeading tool capable of internally debeading butt-welded pipe made of PVC and similarly hard plastics has a work head that can be coupled to a distal end of a torque tube. The work head includes a motor carrying a cutter which is oriented at an angle, e.g., 12 degrees, to the interior pipe wall for cutting the weld bead as the tool is rotated inside the pipe. The work head cutter can be moved between an insertion/removal position away from the side wall and a cutting position against the bead on the side wall. A locator assembly that contacts the bead during insertion of the work head aids in positioning the cutter to straddle the weld bead. A pipe cleaner can be prepositioned in the pipe before butt-welding to be engaged upon removal of the work head to pull weld bead chips and fines from the pipe.

10 Claims, 5 Drawing Sheets

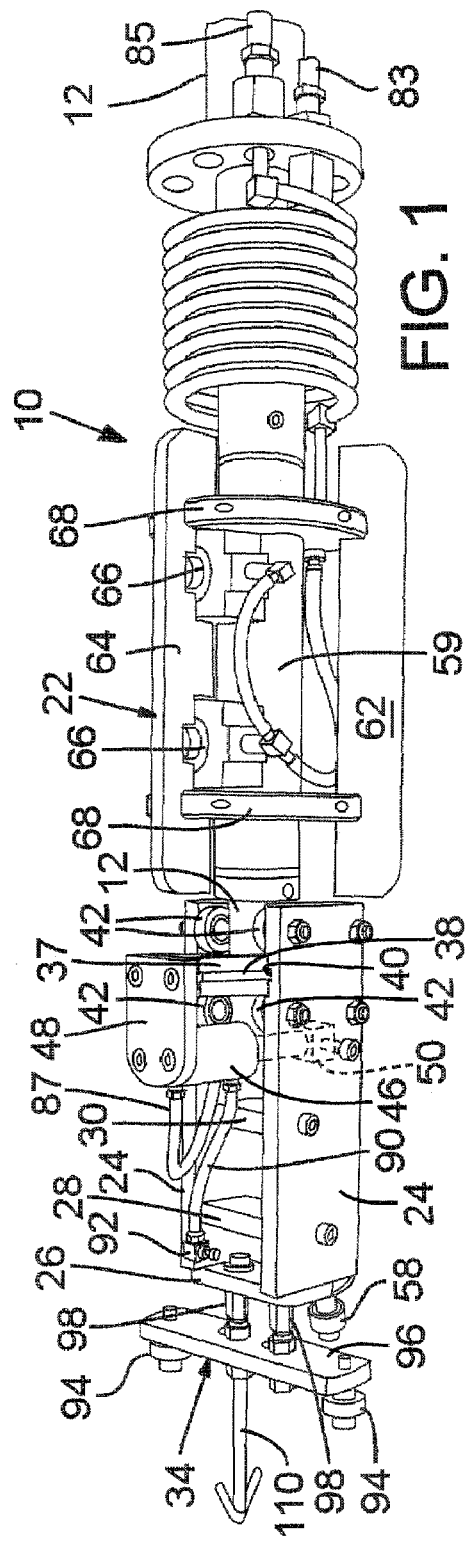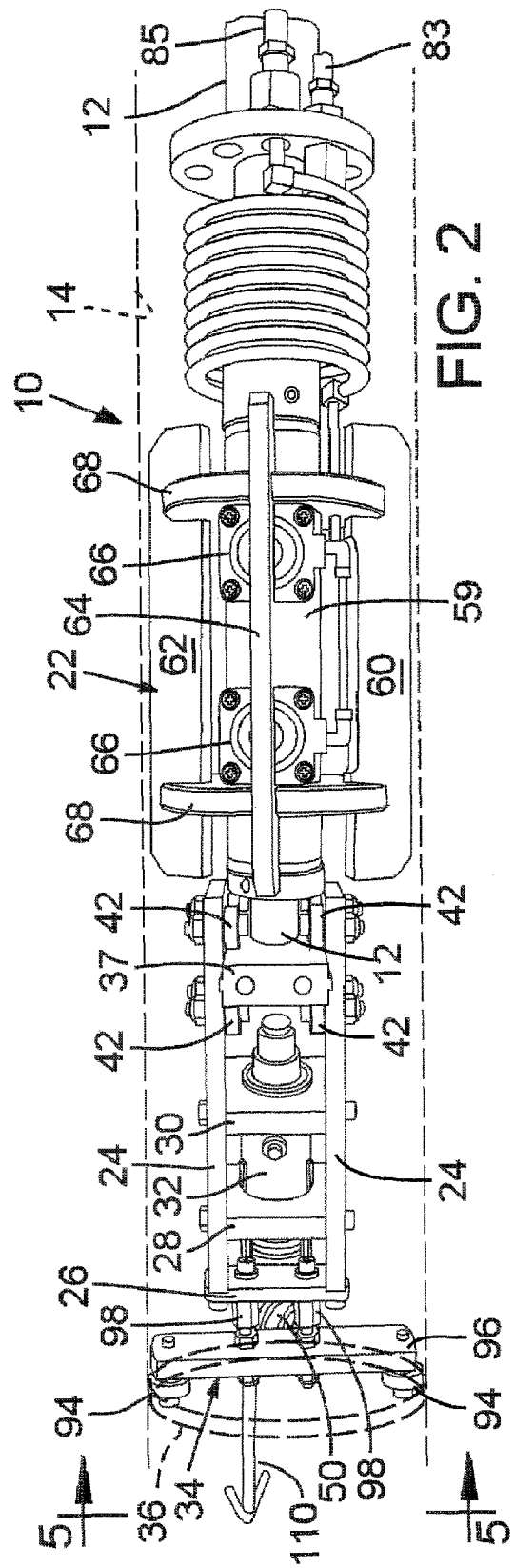

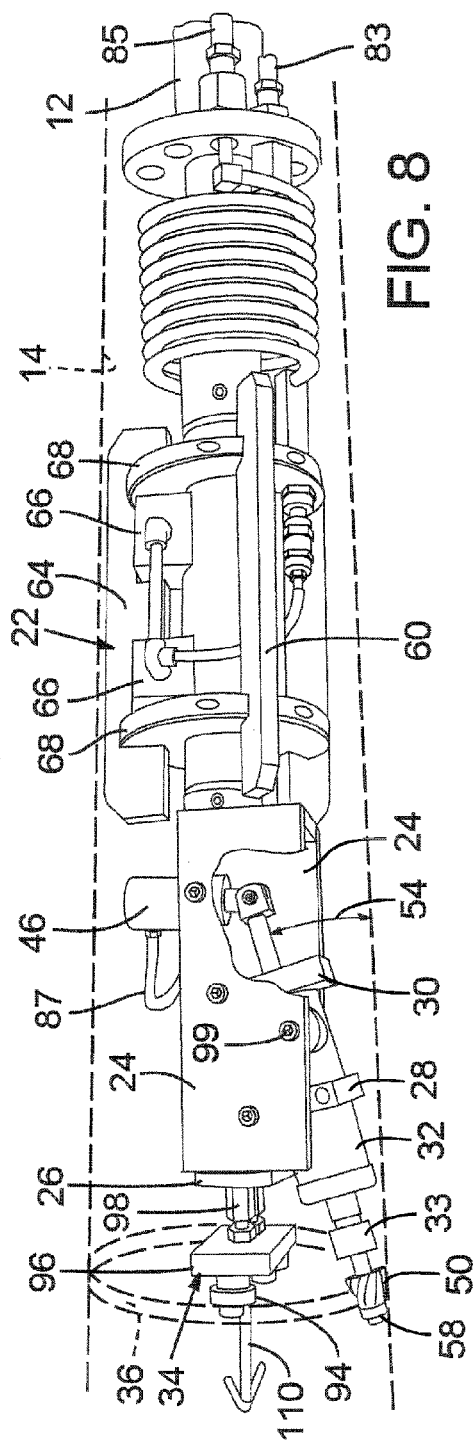
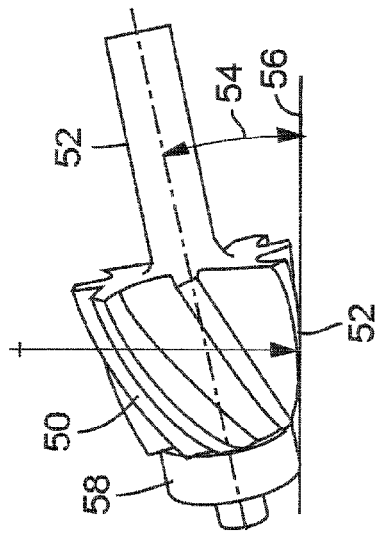
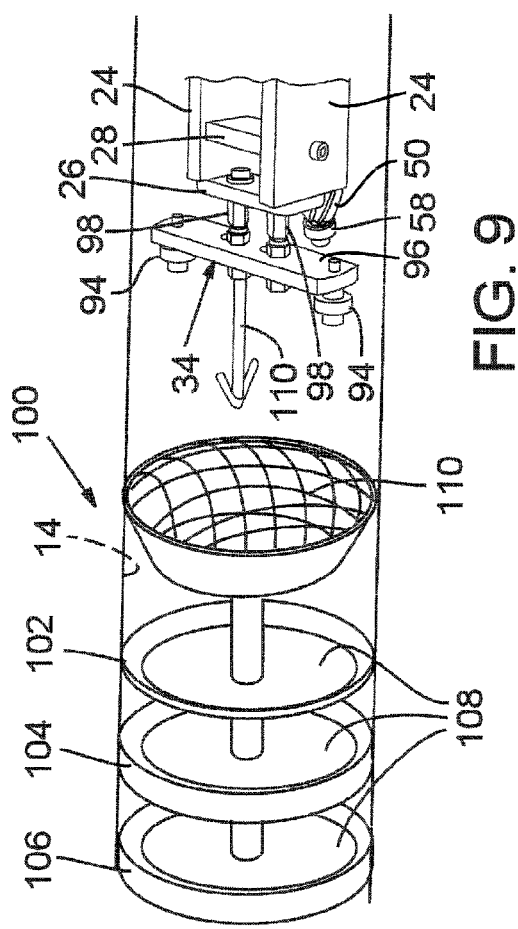
FIG. 7
FIG. 8
FIG. 9

DEBEADING TOOL FOR BUTT-WELDED PLASTIC PIPE

BACKGROUND OF THE INVENTION

This invention relates to debeading or trimming of weld flash inside a butt-welded plastic pipe and more particularly to a tool that can be used with hard plastics such as PVC, PVDF, polypropylene and the like. Plastic pipes and pipe liners typically are made in standard lengths, such as 20 feet or 40 feet, and are interconnected end-to-end to make a long pipe string.

Butt welding of plastic pipe produces a weld bead or flash that is preferably removed before the pipe is placed in service for conveying liquids to reduce flow restriction and reduction, turbulence wear, biofilm/bacteria entrapment and potential for blockages forming at the joints. Plastic pipes are also used as conduit for cable, and, again, it is desirable to remove the weld flash before attempting to pull cable into the butt-welded pipe string.

In the past, such pipes have been made of polyethylene, which is a relatively soft thermoplastic that can be readily butt-welded and easily debeaded. A tool known as the Bead Trimmer II™ has been made and sold by R & L Manufacturing Inc. of Camas, Wash. The tool includes a bead trimmer head assembly that mounts on one end of a series of interconnected torque tubes and is pushed into the butt-welded pipe until the internal bead or weld flash is contacted. The head assembly has a central shaft that couples to the torque tube end and has a centering disk sized to the pipe for retaining the head assembly centered in the pipe as it is inserted. A gauge mounted on the periphery of the centering disk contacts the bead when the tool reaches the bead. When contact is made, the operator manually rotates a T-shaped bar mounted at the opposite end of the torque tube string to rotate a cutter around a full circle inside of the pipe. The cutter includes a fixed blade that extends lengthwise along the sidewall of the pipe, aligned with the gauge so that, when the gauge contacts the weld flash or bead, the blade straddles the bead. The blade has an edge that is beveled to cut into the bead when rotated until locating registers at each end of the blade holder contact the inner wall of the pipe, at which point the blade holder maintains a constant cutting depth of the blade edge. Continued rotation of the head assembly cuts the bead away from the pipe wall. When this action is completed, the head assembly is withdrawn from the pipe. Several hooks distributed radially around the downstream end of the head assembly engage the cut-away bead and drag it from the pipe.

Recent formulations of PVC, such as C-900 and C-905 fusible PVC, have enabled butt-welding PVC pipes. The fusion methods developed for this material likewise produces a weld flash or bead, which it is also desirable to remove. PVC is much harder than polyethylene; so hard, in fact, that the Bead Trimmer II™ is incapable of cutting the weld flash or bead. Other plastics that are similarly hard include PVDF and polypropylene.

Accordingly, a need remains for a way to debead butt-welded pipe made of PVC, PVDF, polypropylene and other similarly hard plastics.

SUMMARY OF THE INVENTION

One aspect of the invention is a tool capable of internally debeading butt-welded pipe made of PVC and similarly hard plastics. The tool has rotary cutter that can be positioned in alignment with and pressed against the weld bead for cutting the bead. The cutter is preferably positioned at an angle to the pipe side wall.

Another aspect of the invention is a method for internally debeading butt-welded pipe made of PVC and similarly hard plastics. The rotary cutter is operated while the tool is rotated around the inside of the pipe.

The foregoing and other objects, features and advantages of the invention will become more readily apparent from the following detailed description of a preferred embodiment of the invention that proceeds with reference to the accompanying drawings.

BRIEF DESCRIPTION OF DRAWINGS

FIG. 1 is an upper perspective view of one embodiment of the work head of a debeading tool according to the invention.

FIG. 2 is a top plan view of the work head of the debeading tool of FIG. 1, in a butt-welded PVC pipe shown in dashed lines, with the motor positioning actuator removed to show interior structure.

FIG. 7 is a side perspective view of the cutter of FIGS. 1-6.

FIG. 8 is a side elevation view of an alternative embodiment of the tool according to the invention, particularly suited for narrow diameter pipes.

FIG. 9 is a side perspective view of an embodiment of a pipe cleaning tool positioned in the pipe for removing PVC chips and dust after cutting away the bead.

DETAILED DESCRIPTION

Figure 3:
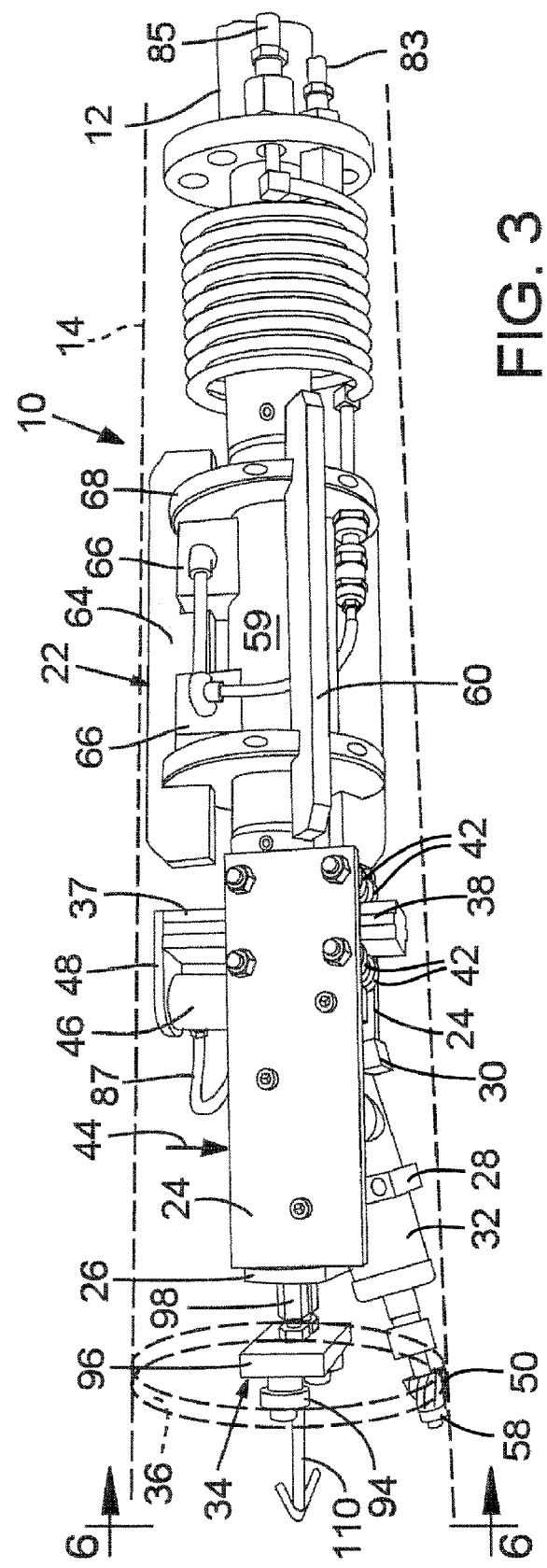
FIG. 3 is a side perspective view of the work head of FIG. 2, with the cutting tool in a lowered position for cutting the bead from inside a butt-welded PVC pipe.
Figure 4A:
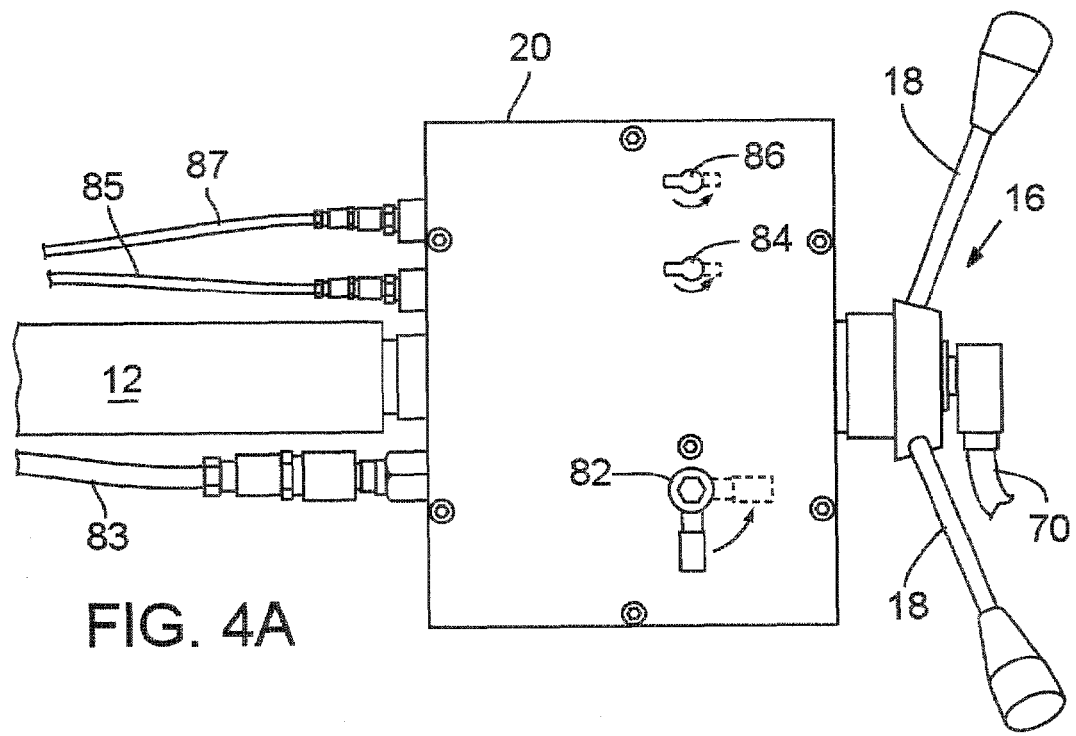
FIGS. 4A and 4B are top and bottom views, respectively, of the operator end of a debeading tool according to the invention.
Figure 4B:
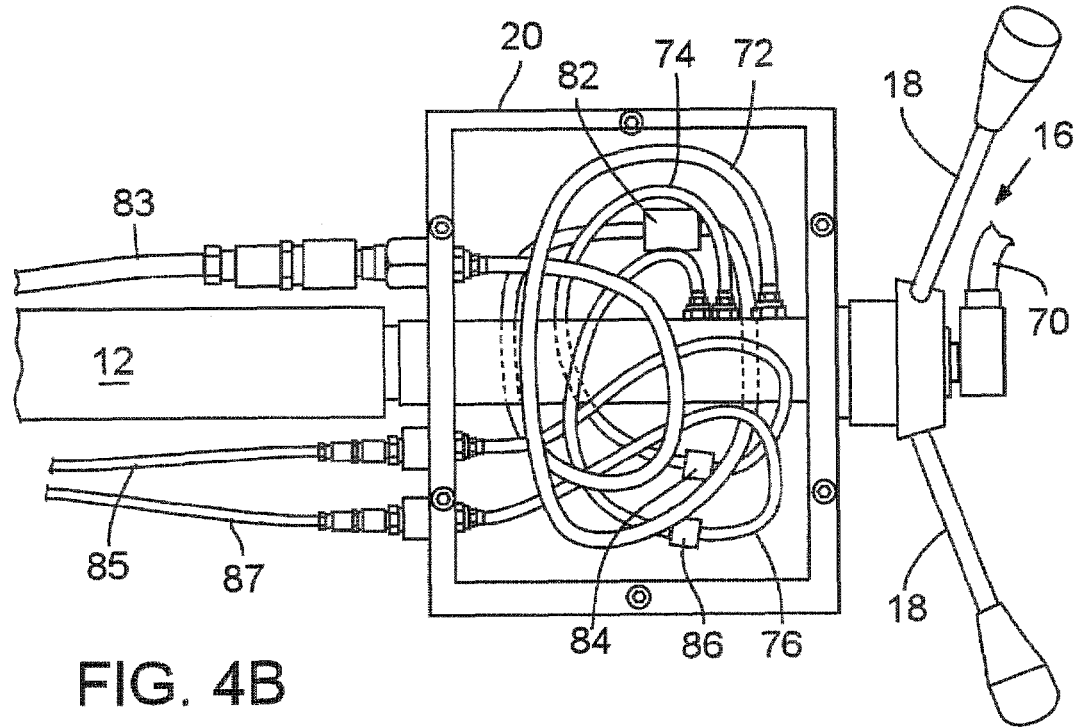
Figure 5:
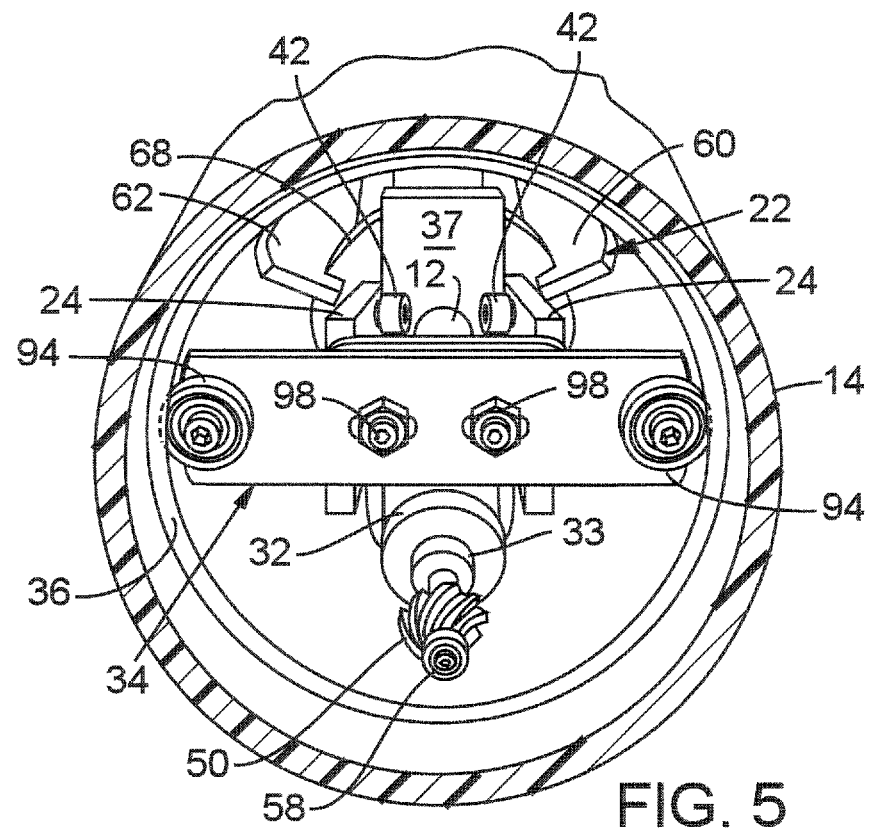
FIG. 5 is a front elevation view of the work head as seen through a cross-section of the pipe along lines 5-5 of FIG. 2, shown with the cutting tool in a retracted position for placement in a butt-welded PVC pipe.
Figure 6:
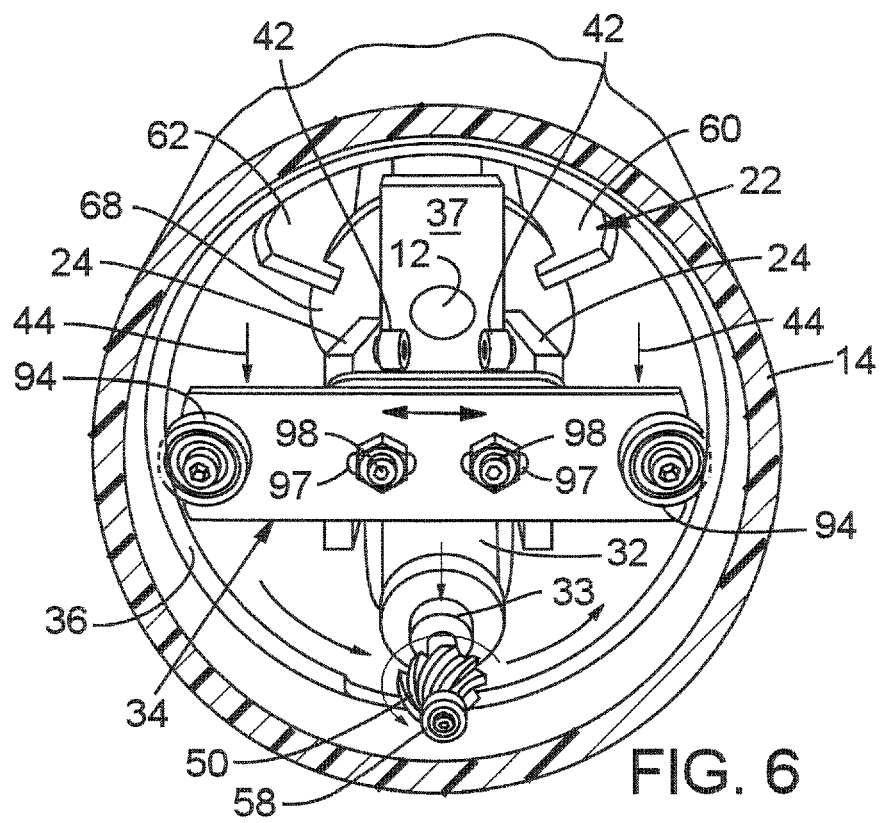
FIG. 6 is a front elevation view of the work head through a cross-section of the pipe along lines 6-6 of FIG. 3, shown during debeading of a weld flash in a PVC pipe.

FIGS. 1-6 are various views of one embodiment of the work head 10 of a debeading tool for debeading a joint in butt-welded plastic pipe according to the invention. The debeading tool comprises generally the work head 10, a torque tube 12 for insertion into a length of cylindrical pipe 14, and a handle structure 16 for rotating the torque tube about an axis that is substantially coaxial with the pipe. The handle structure can be a simple T-bar, or a pair of torque arms 18 as shown in FIGS. 4A and 4B, or a steering wheel mounted on the operator or proximal end of the torque tube 12. The torque tube can be a continuous length of pipe with coupler at each end to connect to the handle structure 16 and to the cutting head 10, or can be a known structure consisting of a series of shorter tube lengths, e.g., 8-foot lengths, each interconnected by couplers (not shown) that link the tube lengths together and to the cutting head and handle structure. A control box 20, further described below, is mounted on the handle structure 16 over the operator end of the torque tube.

The debeading tool 10 includes a clamp 22 positioned along the torque tube to fix the tool in a debeading position lengthwise in the pipe. In the embodiment shown in FIGS. 1-6, the clamp is integrated into the work head 10 to fit inside the PVD pipe, as further described below.

The work head 10 of the debeading tool includes including a frame sized to fit within the pipe, coupled to a distal end of the torque tube 12. In the illustrated embodiment, this frame includes a pair of parallel spaced side frame members 24 coupled to the torque tube and extending approximately parallel to the torque tube axis. Three transverse web members 26, 28, 30 interconnect the side members. Web members 28, 30 support a rotary cutter motor 32 and web member 26 supports a locating gauge 34 for contacting the interior weld flash or bead 36 in the butt-welded pipe when the tool is pushed longitudinally into the pipe, as described below.

The frame members 24 are coupled to a transverse track structure mounted on a distal end of the torque tube. This track structure can be formed by a rectangular metal bar 37 affixed perpendicularly to the end of a coupler received in the end of the torque tube. The metal bar has parallel ridges 38 on opposite sides which are slidable in grooves 40 in the interior sidewalls of the side frame members. The side frame members also have eight bearing rollers 42, four each mounted on each side of the metal bar 37. The ridges 38, mating grooves 40 and rollers 42 rigidly support the frame structure in parallel relationship to the torque tube while allowing translational movement as indicated by arrows 44.

A pneumatic actuator 46 having a cylinder coupled to one end of the track structure by a mounting arm 48 (not shown in FIG. 2) and a ram coupled to a transverse pivot 50 between the side frame members. The actuator could alternatively be hydraulic or an electric solenoid. This actuator moves the frame structure transversely toward and away from the axis of the torque tube, thereby moving the rotary cutting motor 32 between the insertion/removal position shown in FIG. 5 and a cutting position shown in FIG. 6. The rotary cutter motor 32 in this embodiment is mounted on the frame at an angle to the torque tube such that the motor's output shaft and chuck 33 are oriented in the cutting position at a predetermined angle, such as 12 degrees, relative to the torque tube axis.

A rotary multifluted cutter 50 is mounted in the motor's chuck 33 on the output shaft and the motor is mounted longitudinally relative to the frame side members so that the cutter 50 is positioned in longitudinal alignment with the locating gauge 34. The cutter 50 has a central shaft 52 and a plurality of carbide cutting flutes 52 oriented at an angle 54 to the motor output shaft, e.g., 12 degrees, as shown in FIG. 7, such that the cutting flutes are substantially parallel to an interior wall 56 of the pipe 14 when the tool is in the cutting position for cutting the weld bead 36. When the locating gauge contacts the weld bead, the cutting flutes 52 span the weld bead; that is, the length of the flutes is approximately bisected by the weld bead. The cutting flutes 52 are curved outwardly then inwardly from end-to-end about an arc of a predetermined radius, e.g., of about 3.5 inches (8.9 cm). A bearing roller 58 is mounted on the distal end of the cutter 50, in axial alignment with the central shaft 52. The bearing roller serves as a depth gauge which contacts the pipe side wall 56 to maintain the cutting flutes at an elevation that cuts the weld bead without cutting too deeply into the pipe sidewall.

The rotary motor 32 in this embodiment is a pneumatic rotary motor, preferably capable of high speed operation, e.g., 20,000 rpm, but a hydraulic or electric motor could be used instead. The control panel 20 positioned adjacent the handle structure 16 contains valves and handles for the operator manually independently to operate clamp 22 to fix the work head 10 longitudinally in the pipe once the locating gauge 34 contacts the weld bead 36, to operate the actuator 46 for moving the frame, cutter motor and cutter from the insertion/removal position to the cutting position and back, and to turn the cutter motor 32 on and off. If hydraulic or electric actuators and/or motors are used instead of pneumatic, those skilled in the art can readily substitute the appropriate types of controls in panel 20.

The clamp 22 in the illustrated embodiment is mounted between the distal end of the torque tube and the work head, but need not be. For example, the clamp can be positioned around the operator end of the torque tube and can be an annular fitting adjacent the control box that can move with the torque tube during insertion into the PVC pipe and, when the work head contacts the internal bead at the butt-welded joint in two pipes, can be coupled to the operator end of the pipe to fix the torque tube axially in position. In the illustrated embodiment of FIGS. 1-6, the clamp 22 is journaled on a cylindrical sleeve 58 to rotate freely over a central shaft extending axially between the distal end of the torque tube and the work head. The clamp structure includes three radial vanes 60, 62, 64 arranged substantially parallel and equiangularly around the axis of the torque tube on two longitudinally-spaced disks mounted around sleeve 58. Two of the vanes 62, 64 can be fixed to the disks. The third vane 64 is movable radially in slots in the disks. Two longitudinally-spaced actuators 66 each have a cylinder mounted on the sleeve 58 and a ram coupled to an inner edge of the vane 64 to push the vane outward to compress radially against the interior side wall of the pipe when actuated.

The control panel 20 includes a coupling 70 in the proximal end of the handle structure through which pressurized air is supplied to a manifold inside the handle structure having three output conduits 72, 74, 76. Conduit 72 connects to a valve 82 and conduits 74, 76 to valves 84, 86, respectively, which can be actuated from the upper side of the control panel. These valves are coupled to hoses 83, 85, 87 that extend along the length of the torque tube, respectively, to the motor 32, the motor positioning actuator 46, and clamp actuators 66. The line to the motor positioning actuator 46 includes a relief line 90 and flow control valve 92 to dampen the actuation of movement of the motor toward the cutting position, to avoid damage to the cutter. Sufficient length for the hoses is provided at the control panel and also at the work head to permit the handle structure, control panel, torque tube and work head to rotate through a full circle relative to the clamp 22 without stressing or crimping the hoses.

The locating gauge 34 in this embodiment comprises a pair of bearing rollers 94 mounted in transversely-spaced position on a cross-member 96 supported on web member 26 by a pair of laterally spaced studs 98. The studs connect to cross member 96 through oblong holes 97 so that the cross member has some lateral play to accommodate variations in alignment between the axis of the debeading tool and that of the pipe. The bearing rollers 94 are spaced to fit loosely within the pipe, for example, providing about one-quarter inch of play. This structure is arranged to position the forward end of the bearing rollers axially in alignment with approximately the lengthwise center of the cutter. When the bearing rollers are in contact with the weld bead 36, the cutter straddles the weld bead.

Referring to FIG. 8, another embodiment of the debeading tool has a frame that is fixed relative to the axis of the torque tube, rather than on a transversely movable track. The rotary cutting motor 32 is pivotably mounted on the side members by pivot pin 99 and the actuator 46 is connected to the rearward end of the motor for movement of the cutter 50 between a retracted position and the cutting position at the predetermined angle relative to the torque tube axis. As mentioned above, the cutter 50 includes a rotatable gauge 58 at its distal end having a diameter sized relative to the cutter such that the gauge supports the cutter on a side wall of the pipe at the predetermined angle 54, e.g., 12 degrees. In this embodiment, the gauge 58 again supports the cutter at that angle against the pressure toward the pipe exerted on the motor by actuator 46.

Referring to FIG. 9, a pipe cleaner 100 sized to fit the diameter of pipe is inserted into one section of pipe before a next section is butt-welded to it. The pipe cleaner is made of circular disks of a flexible material, such as neoprene, rubber, flexible PVC and the like, mounted coaxially on a shaft. In one embodiment, shown in FIG. 9, the pipe cleaner is formed as three spaced rubber disks 102, 104, 106 mounted on a shaft. The middle disk 104 is neoprene foam and the two end disks are 60-70 durometer neoprene. The disks are held in spaced position between pairs of large metal or rigid plastic washers 108, mounted on the shaft concentrically with the disks, leaving only a peripheral ¾ inch or so of the rubber or neoprene exposed. Other arrangements can be used to effectively drag and wipe chips and chaff from cutting the PVC pipe bead from inside the pipe. An engagement structure 110 is provided at one end of the disk and shaft assembly, in position to be engaged by a hook or harpoon 112 on the end of the locator assembly, for pulling the pipe cleaner through the pipe as the debeading tool is withdrawn after cutting away the internal bead. The engagement structure is shown as a wire mesh with a spacing of the wires close enough for the harpoon to fit into the openings in the mesh and then engage the adjacent wires when retracted. Alternatively, the engagement structure can be formed by looped structure at the end of the shaft that is simply a series of loops of small gauge twisted wire cable arranged in a donut-shaped nest or cup around the center shaft so the harpoon 112 on the bead locator assembly grabs a few strands of the twisted wire cable to pull the pipe cleaner through the pipe as the debeading tool is being retracted.

In operation, the pipe cleaner 100 is inserted into an end of a first pipe segment before butt-welding a second pipe segment to it. Then the two pipe segments are butt-welded together. Then, the debeading tool work head 10 and torque tube 12 are inserted into the distal or upstream end of the second pipe segment until the locating gauge 34 contacts the weld bead 36. At this time, the handle structure 16 is close to the end of the second pipe. The operator then actuates the actuators 66 to operate the clamp assembly and thereby fix the work head in place in the pipe with the locator assembly 34 and cutter 50 aligned longitudinally with the weld bead 36. Then the actuator 48 is operated to move the cutter 50 against the weld bead 36. The bearing roller 58 contacts the interior wall of the pipe to maintain the predetermined angle, (e.g., 12 degrees). Then, the motor 32 is turned on to rotate the cutter 50 while actuator 48 maintains pressure of the cutter against the weld bead. The operator then rotates handle structure 16 to rotate the work head around the inside of the pipe as the cutter cuts the weld bead. When finished, the motor is turned off, the cutter is moved away from the side wall and the clamp 22 is unclamped; then the debeading tool is pushed further into the pipe so that the harpoon 112 is protruding into the mesh or nest of wires 110 in the pipe cleaner 100. Then, the tools are retracted from the pipe. The engagement structure 110 is engaged by a hook or harpoon 112 and pulls the pipe cleaner 100 through the pipe, cleaning the pipe. This procedure is then repeated for each successive segment of pipe.

Having described and illustrated the principles of the invention in various embodiments thereof, it should be apparent that the invention can be modified in arrangement and detail without departing from such principles. We claim all modifications and variations coming within the spirit and scope of the following claims.

The invention claimed is:

1. A debeading tool for debeading a joint in butt-welded plastic pipe, comprising:
   a torque tube for insertion into a length of cylindrical pipe;
   means for rotating the torque tube about an axis that is substantially coaxial with the pipe;
   a clamp positioned along the torque tube to fix the tool in a debeading position lengthwise in the pipe;
   a work head including a frame sized to fit within the pipe, coupled to a distal end of the torque tube;
   a locating gauge mounted on a distal end of the frame for contacting a weld bead when the tool is pushed longitudinally into the pipe; and
   a rotary cutting motor mounted on the frame for movement transversely of the torque tube axis between an insertion/removal position and a cutting position and having an output shaft oriented in the cutting position at a predetermined angle relative to the torque tube axis; and
   a rotary multifluted cutter mounted on the output shaft in longitudinal alignment with the locating gauge;
   the cutter having a plurality of cutting flutes oriented at an angle to the motor output shaft such that the cutting flutes are substantially parallel to an interior wall of the pipe when the tool is in the cutting position for cutting the weld bead.

2. A debeading tool according to claim 1 including a means for moving the rotary cutting motor between the insertion/removal position and a cutting position.

3. A debeading tool according to claim 1 including a control panel positioned adjacent the means for rotating for the operator to actuate the means for moving the frame.

4. A debeading tool according to claim 1 including a control panel positioned adjacent the means for rotating for the operator to actuate one of the clamp and the rotary cutting motor.

5. A debeading tool according to claim 1 in which the clamp is mounted between the distal end of the torque tube and the work head.

6. A debeading tool according to claim 5 in which the clamp includes three vanes arranged substantially parallel and equi-angularly around the axis of the torque tube, at least one of the vanes having an actuator coupled thereto for advancing the vane radially into contact with the interior wall of the pipe.

7. A debeading tool according to claim 5 in which the clamp is journaled for free rotation on a shaft extending axially between the distal end of the torque tube and the work head.

8. A debeading tool according to claim 1 in which the frame includes a track mounted transversely to the axis of the torque tube and a pair of spaced side members slidably connected to the track for movement of the side members translationally relative to the axis of the torque tube, the rotary cutting motor being mounted on the side members at the predetermined angle relative to the torque tube axis.

9. A debeading tool according to claim 1 in which the rotary cutting motor is pivotably mounted on the side members for movement of the output shaft between a retracted position and the cutting position at the predetermined angle relative to the torque tube axis.

10. A debeading tool according to claim 1 in which the cutter includes a rotatable gauge at a distal end of the cutter having a diameter sized relative to the cutter such that the gauge supports the cutter on a side wall of the pipe at said predetermined angle.

* * * * *